United States Patent [19]
Sloan et al.

[11] Patent Number: 5,716,061
[45] Date of Patent: Feb. 10, 1998

[54] DOLLY FOR MOVING A SNOWMOBILE

[75] Inventors: Ken Sloan, Milford; Gary Cross, Estherville; Jim Danbom; Jan Danbom, both of Milford; Terry Semprini, Spirit Lake; Scott Danbom, Milford; Ron Hickman; Earl Ballou, both of Spirit Lake; Jeff Wobbema, Arnolds Park; Joseph Feuerhelm, West Okoboji; Roland Taylor, Terril, all of Iowa

[73] Assignee: Cycle Country Accessories Corp., Milford, Iowa

[21] Appl. No.: 598,966

[22] Filed: Feb. 9, 1996

(Under 37 CFR 1.47)

[51] Int. Cl.[6] .................................................. B62B 5/00
[52] U.S. Cl. ...................... 280/43.23; 254/9 B; 254/131; 280/47.27; 414/490
[58] Field of Search ........................... 414/444, 490, 414/495; 254/9 B, 11, 44, 120, 131, 93 R; 280/43.17, 43.22, 43.23, 47.17, 47.21, 47.27, 402

[56] References Cited

U.S. PATENT DOCUMENTS

| 2,744,762 | 5/1956 | Kirk | 254/113 X |
|---|---|---|---|
| 3,410,569 | 11/1968 | Blake | 280/43.23 |
| 3,635,492 | 1/1972 | Mauldin | 280/43.23 |
| 3,856,319 | 12/1974 | Hardy | 280/43.23 X |
| 4,033,422 | 7/1977 | Benning | 414/495 X |
| 5,387,058 | 2/1995 | Smoot | 280/43.23 X |

OTHER PUBLICATIONS

1995 J & L Power Products Brochure on Sno–Jack Dolly.
1995 Bell Industries Catalog, pp. 407 and 409.
1995 All Parts Catalog, p. 35.
1995–1996 Cambridge Metals & Plastics, Inc. Catalog, p. 16.
1995 Parts Unlimited Catalog (4 "Accessories" pages enclosed).

*Primary Examiner*—Brian L. Johnson
*Assistant Examiner*—Michael Mar
*Attorney, Agent, or Firm*—Zarley, McKee, Thomte, Voorhees & Sease; Dennis L. Thomte

[57] ABSTRACT

A dolly for moving a snowmobile on a supporting surface such as a garage floor, ground, etc., wherein the dolly may be positioned beneath the snowmobile from the forward portion of the snowmobile. The dolly has a jack associated therewith which may be operated to raise the track portion of the snowmobile from the ground. The forward end of the dolly may then be moved upwardly so that the skis of the snowmobile are also moved out of engagement with the supporting surface. The snowmobile may then be conveniently moved from one location to another.

9 Claims, 7 Drawing Sheets

DOLLY FOR MOVING A SNOWMOBILE

BACKGROUND OF THE INVENTION

1. Field of the Invention

The present invention relates to a dolly, and more particularly to a dolly for moving a snowmobile which is resting on a supporting surface such as a floor or the ground. More particularly, the present invention relates to a dolly which may be positioned beneath the snowmobile, from the forward end thereof, to raise the snowmobile from engagement with the supporting surface so that the snowmobile may be conveniently moved for storage, repair, etc.

2. Description of the Related Art

Snowmobiles have become extremely popular and normally comprise a body having a pair of horizontally spaced-apart skis at the forward end thereof and a movable endless track extending downwardly from the underside of the body at the rearward end of the body. The snowmobile is propelled by means of the endless track and is steered by means of the skis at the forward end thereof. On many occasions, it is necessary to move the snowmobile from one location to another within a building, or even on a ground surface. When the snowmobile is located within a building or the like, it is sometimes desirable to be able to move the snowmobile for storage purposes or for repair purposes. Inasmuch as the snowmobiles are designed for maneuvering on a snow surface, the movement of the same on a dry surface such as a garage floor or on a ground surface is extremely difficult.

Many types of dollies have been previously provided for raising the snowmobile out of ground engagement so that the snowmobile may be moved, but is believed that the prior art dollies suffer from many disadvantages. With respect to those dollies which the inventors are familiar with, they are either extremely difficult to operate, difficult to maneuver, and are dangerous. Further, certain of the prior art dollies are designed for use with a particular model snowmobile. Many adapters must be utilized therewith so that the dolly may be used to move various sizes of snowmobiles. Further, the prior art dollies are extremely difficult to operate on ground surfaces, since the small wheels associated therewith sink into the ground.

SUMMARY OF THE INVENTION

A dolly is described for moving a snowmobile on a supporting surface such as a garage floor, the ground, etc. Normally, the snowmobile includes a body having a forward end, a rearward end, opposite sides, an underside, a movable endless track extending downwardly from the underside of the body at the rearward end thereof which is positioned between the opposite sides and a pair of horizontally spaced-apart skis at the forward end of the body. The dolly of this invention comprises a substantially U-shaped frame including an elongated front frame member, an elongated first side frame member secured to the front frame member at one end thereof and which extends rearwardly therefrom and an elongated second side frame member secured to the front frame member at the other end thereof and which also extends rearwardly therefrom. The distance between the first and second side frame members is such that the U-shaped frame may be moved rearwardly underneath the body of the snowmobile between the skis and being such that the first and second side frame members may be positioned on opposite sides of the track. An elongated pivot shaft is rotatably secured to the first and second side frame members and extends therebetween. First and second wheel supports are secured at the opposite ends of the pivot shaft and have wheels mounted thereon. An elongated handle extends forwardly from the U-shaped frame and has a hydraulic jack operatively secured thereto. The jack is operatively interconnected, by means of a linkage, to the pivot shaft so that extension of the ram from the jack causes the pivot shaft to rotate with respect to the U-shaped frame member to bring the first and second wheels downwardly into engagement with the supporting surface and thereby raise the U-shaped frame member and the rearward end of the snowmobile positioned thereon upwardly out of engagement with the supporting surface. The forward end of the handle is then moved upwardly so that the skis are moved upwardly from engagement with the supporting surface. The snowmobile may then be maneuvered to its desired location. The hydraulic jack is easily controllable by the operator of the dolly. A pair of larger auxiliary wheels may also be selectively removably secured to the first and second wheel supports.

It is therefore a principal object of the invention to provide an improved dolly for a snowmobile.

Still another object of the invention is to provide a dolly for a snowmobile which is convenient and safe to use.

Still another object of the invention is to provide a dolly for a snowmobile which includes a hydraulic jack to raise the snowmobile from engagement with the supporting surface.

Still another object of the invention is to provide a dolly for a snowmobile including a crank-like member pivotally secured to a handle on the dolly which is not only operable to extend the ram from the jack, but which is also operable to open and close the operating valve on the jack.

Still another object of the invention is to provide a dolly for a snowmobile which includes a pair of auxiliary wheels which may be selectively attached thereto so that the dolly is more easily maneuverable on ground surfaces.

Still another object of the invention is to provide a dolly for a snowmobile which may be folded for storage purposes.

Still another object of the invention is to provide a dolly for a snowmobile which is economical of manufacture, durable in use and refined in appearance.

These and other objects will be apparent to those skilled in the art.

DESCRIPTION OF THE PREFERRED EMBODIMENT

The snowmobile dolly of this invention is referred to generally by the reference numeral 10, while the reference numeral 12 refers to a conventional snowmobile. Snowmobile 12 includes a body 14 having a forward end 16, rearward end 18, opposite sides 20 and 22 (not shown), underside 24, a movable endless track 26 extending downwardly from the underside 24 at the rearward end 18 of body 14 which is positioned between the opposite sides 20 and 22 of the snowmobile, and a pair of horizontally spaced-apart skis 28 at the forward end 16 of the body 14.

Dolly 10 comprises a substantially U-shaped frame 32 including an elongated front frame member 34 having opposite ends 36 and 38, an elongated first side frame member 40 secured to the front frame member 34 at end 36 and extending rearwardly therefrom, and an elongated second side frame member 42 secured to the front frame member 34 at end 36 and which also extends rearwardly therefrom. Although frame 32 is described as being substantially U-shaped, it can be seen from the drawings that the frame 32 is not truly U-shaped.

The distance between the first side frame member 40 and the second side frame member 42 is such that the U-shaped frame 32 may be moved rearwardly beneath the body 14 of the snowmobile 12 between the skis 28 and 30 and is such that the first and second side frame members 40 and 42 may be positioned on opposite sides of the track 26.

Figure 1:
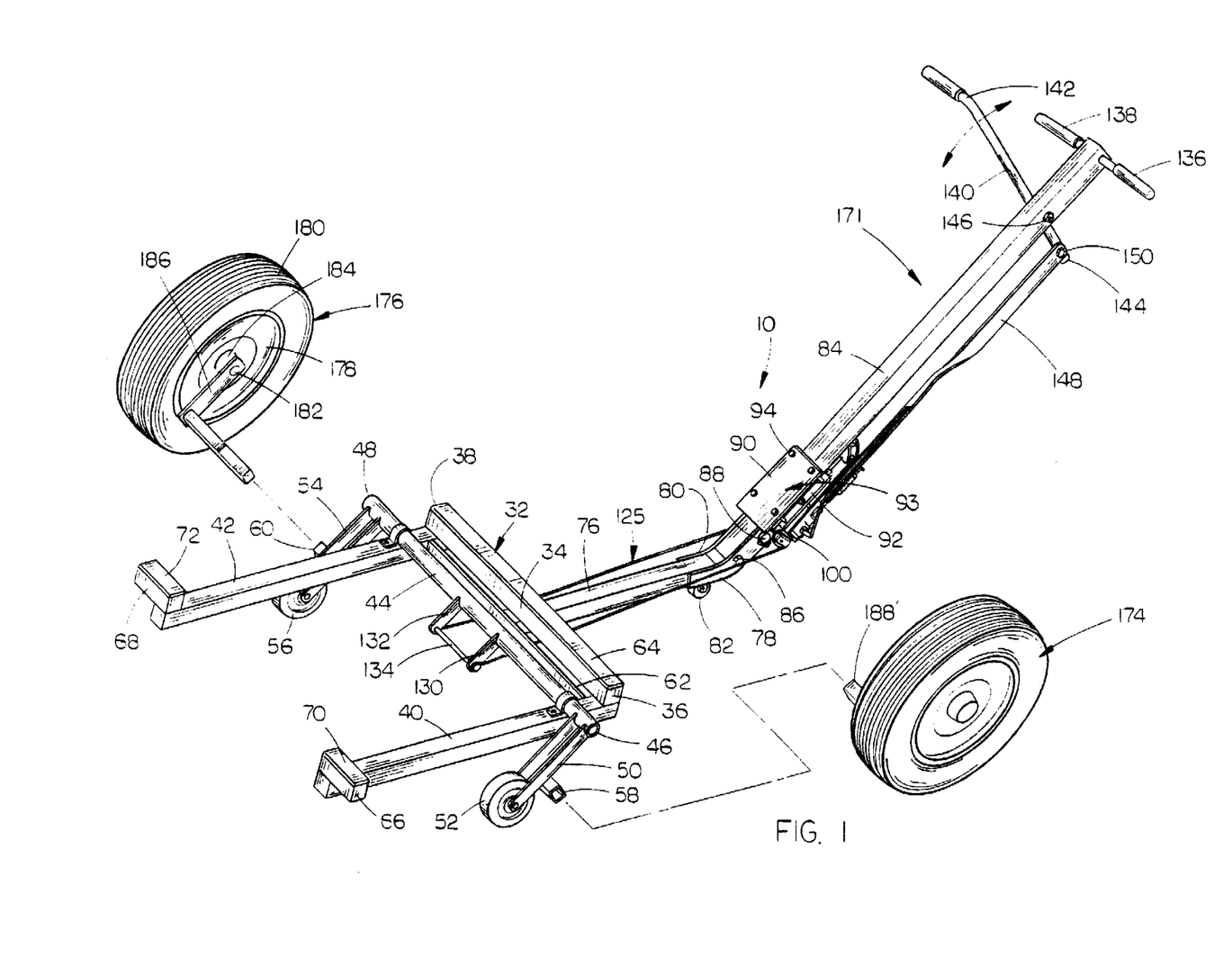
FIG. 1 is a perspective view of the dolly of this invention.
Figure 2:
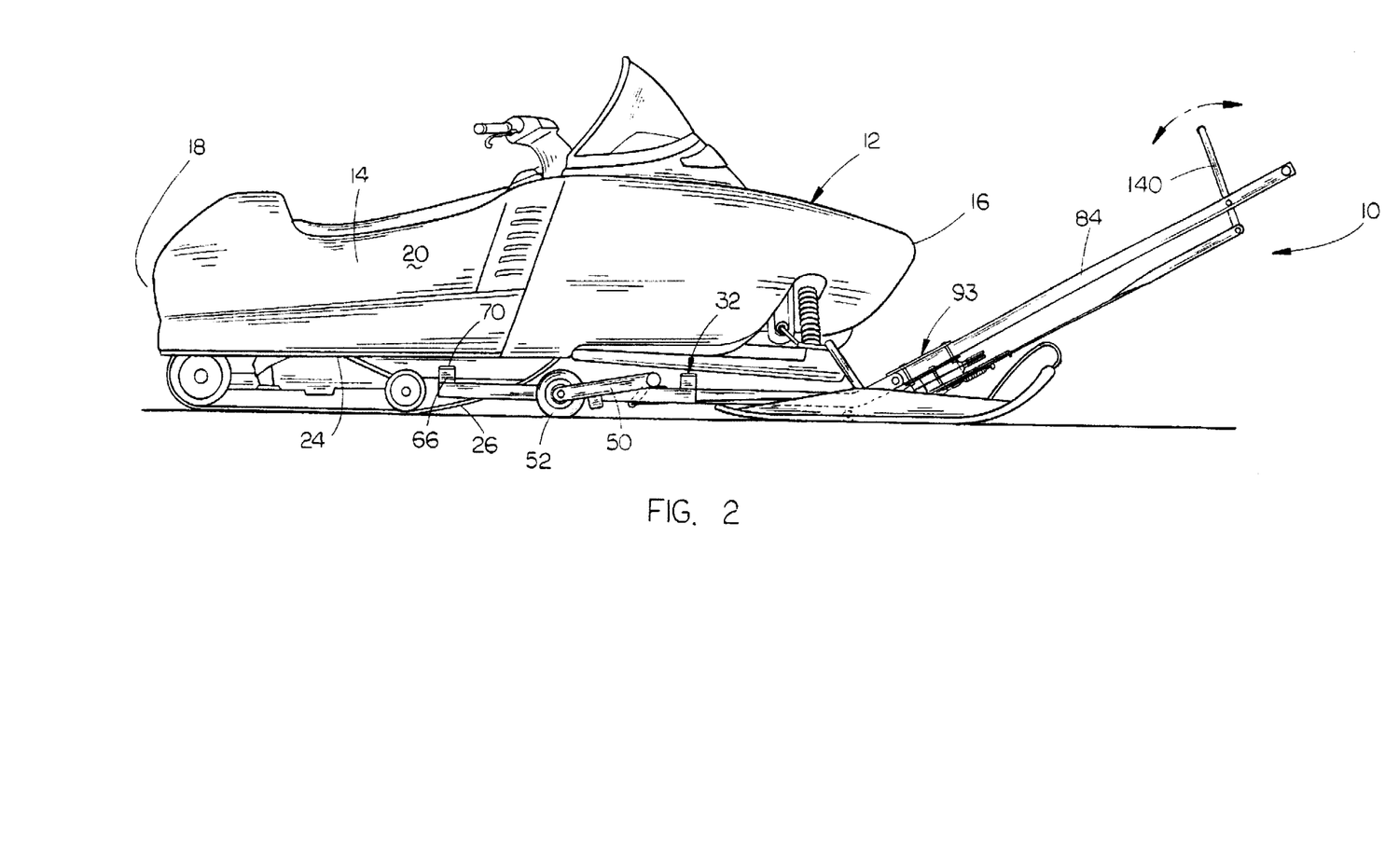
FIG. 2 is a side elevational view of the dolly being positioned beneath the forward end of a snowmobile.

An elongated pivot shaft 44 is rotatably secured to the first and second side frames 40 and 42 and extends therebetween, as illustrated in FIG. 1, so that the ends 46 and 48 of shaft 44 are positioned outwardly of the first and second side frame members 40 and 42, respectively. A first wheel support 50 is secured to end 46 of pivot shaft 44 and extends transversely with respect to the longitudinal axis of the pivot shaft 44. Wheel 52 is rotatably secured to the rearward end of the first wheel support 50, as illustrated in FIG. 1. A second wheel support 54 is secured to end 48 of pivot shaft 44 and extends transversely with respect to the longitudinal axis of the pivot shaft 44. A wheel 56 is rotatably secured to the rearward end of the second wheel support 54, as illustrated in FIG. 1. Square tubes 58 and 60 are secured to wheel supports 50 and 54, respectively, for a purpose to be described more fully hereinafter.

A brace or support member 62 is secured to the forward ends of the first and second side frame members 40 and 42 and extends therebetween, as seen in FIG. 1. A strip 64 of resilient padding is preferably secured to the upper portion of front frame member 34. Support members 66 and 68 are secured to the upper rearward ends of frame members 40 and 42, respectively, and have padding strips 70 and 72 mounted on the upper surfaces thereof, respectively.

An elongated handle portion 76 is welded or otherwise secured to front frame member 34 and support member 62 and extends forwardly therefrom. A pair of angular bracket members 78 and 80 are welded or otherwise secured to the forward end of handle portion 76 (FIG. 1). Support wheel 82 is rotatably mounted at the underside of the forward end of handle portion 76 and is designed to engage the ground surface or floor surface upon which the dolly is being used.

The rearward end of elongated handle portion 84 is secured to bracket members 78 and 80 by means of bolt 86 and removable pin 88, as will be described in more detail hereinafter. Support plate 90 is positioned on the top surface of handle portion 84 near the forward end thereof and has a support plate 92, positioned on the underside of handle portion 84, secured thereto by a plurality of bolts 94. Support plates 90 and 92 form a support 93 which is clamped onto the handle portion 84 by the bolts 94. Support plate 92 includes a downwardly extending flange portion 96 at the forward end thereof. Shaft 98 is secured to the forward end of flange portion 96 by welding and has a pair of pulleys 100 and 102 rotatably mounted on the opposite ends thereof. Pulley 100 is maintained on shaft 98 by bracket 104 and pin 106, while pulley 102 is maintained on the other end of shaft 98 by bracket 108 and pin 110.

The numeral 112 refers to a conventional hydraulic jack which is secured to support plate 92 by a conventional U-bolt assembly 114 (not shown). Hydraulic jack 112 includes an elongated body 116 having an elongated power ram or rod 118 selectively movably extending therefrom. Jack 112 includes a manually operable valve actuator 120 for controlling the operation of the jack. Jack 112 also includes a reciprocatable actuator 122 pivotally mounted thereon for extending the ram 118 from the jack body 116 in conventional fashion. Connector assembly 124 is operatively secured to the outer end of ram 118 by any convenient means and has a cable 125 comprised of elongated flexible cable portions or linkages 126 and 128 secured thereto and which extend rearwardly therefrom, as seen in the drawings. Cable portions 126 and 128 pass beneath and partially around pulleys 100 and 102, respectively, and are maintained in engagement with the pulleys 100 and 102, respectively, by the brackets 104 and 108, respectively. The rearward ends of cable portions 126 and 128 are operatively connected to pivot shaft 44 by any convenient means to effect the rotation of the pivot shaft upon extension of the ram 118 from the body 116. As seen in FIG. 1, a pair of arms 130 and 132 are secured to pivot shaft 44 and normally extend downwardly therefrom. The rearward ends of the cable portions 126 and 128 are removably secured to the lower ends of the arms 130 and 132, respectively, by bolt assembly 134.

As seen in the drawings, a pair of laterally extending hand grips 136 and 138 are secured to the upper forward end of handle portion 84. The numeral 140 refers to a crank-like member having an upper end 142 and a lower end 144. Member 140 is pivotally secured to handle portion 84, below the upper end thereof, on one side thereof, by means of bolt 146. An elongated bar or arm 148 has its upper rearward end pivotally secured to the lower end of member 140 by means of bolt 150. Bar 148 has an elongated slot 152 formed therein above the lower end thereof and an elongated slot 154 formed therein adjacent the lower end thereof. Bolt 156 is movably received in slot 154 and is connected to pipe stub 158 which is secured to the actuator 122. The lower end of spring 160 is secured to the outer end of pipe stub 158, while the upper end thereof is secured to tab or ear 162 which is secured to bar 148. Spring 160 normally urges the actuator 122 to its upper position. When the actuator 120 is in its upper position, bolt 156 is in the upper end of slot 154.

Lever arm 164 is secured to valve actuator 120 and has the lower end of arm or rod 166 pivotally secured thereto. The upper end of arm or rod 166 is movably received in the slot 152 and maintained therein by pin or cotter key 168. Pin or cotter key 170 secures the lower end of rod 166 within the opening 172 in arm 165. When the valve actuator 120 is in its closed position, the upper end of rod 166 is positioned near the lower end of slot 152. When the valve actuator 120 is in its open position, the upper end of arm 166 is positioned approximately midway between the upper and lower ends of the slot 152.

Figure 3:
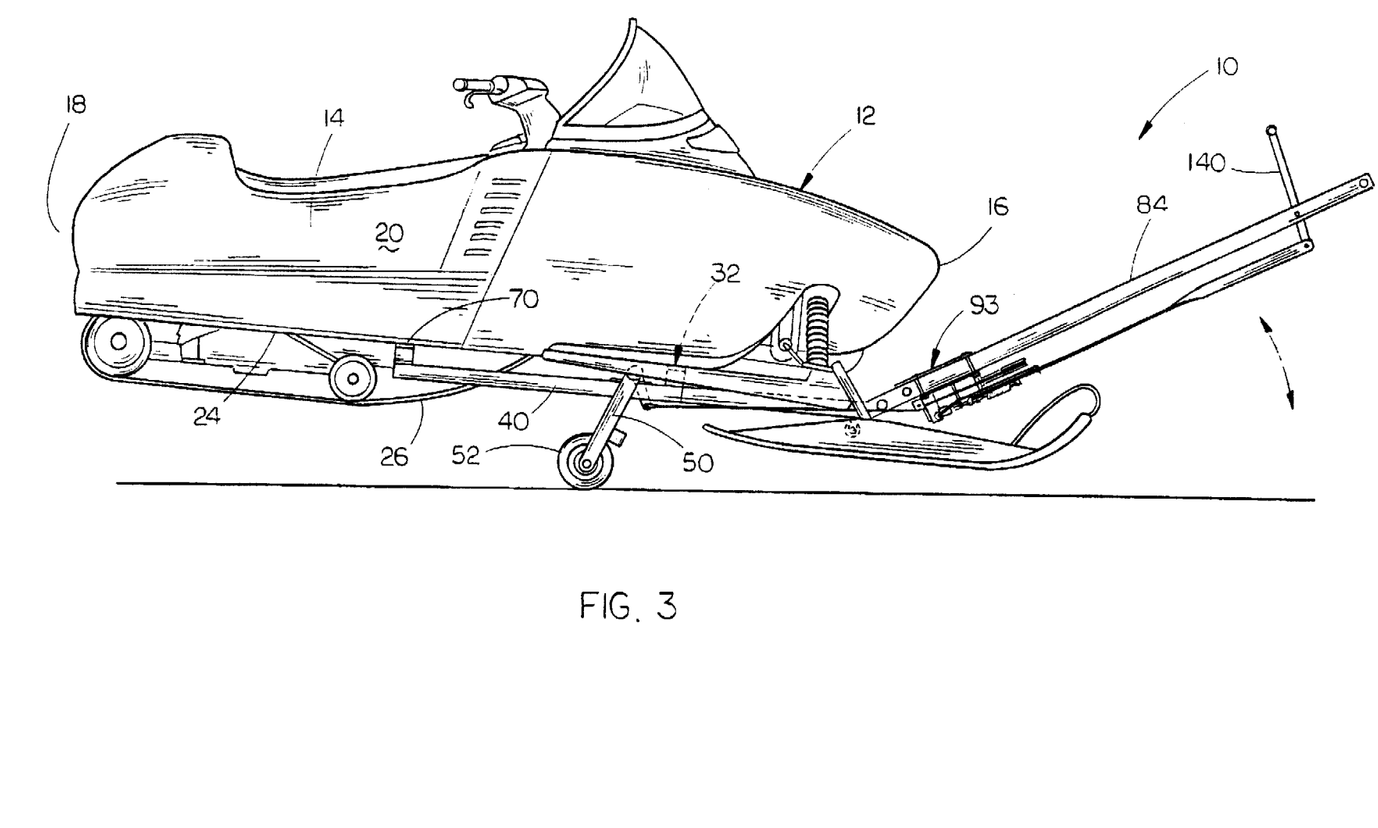
FIG. 3 is a view similar to FIG. 2 except that the dolly has raised the rearward end of a snowmobile from engagement with the supporting surface and the forward end of the dolly has been raised with respect to the supporting surface so that the skis are raised out of engagement with the supporting surface.
Figure 4:
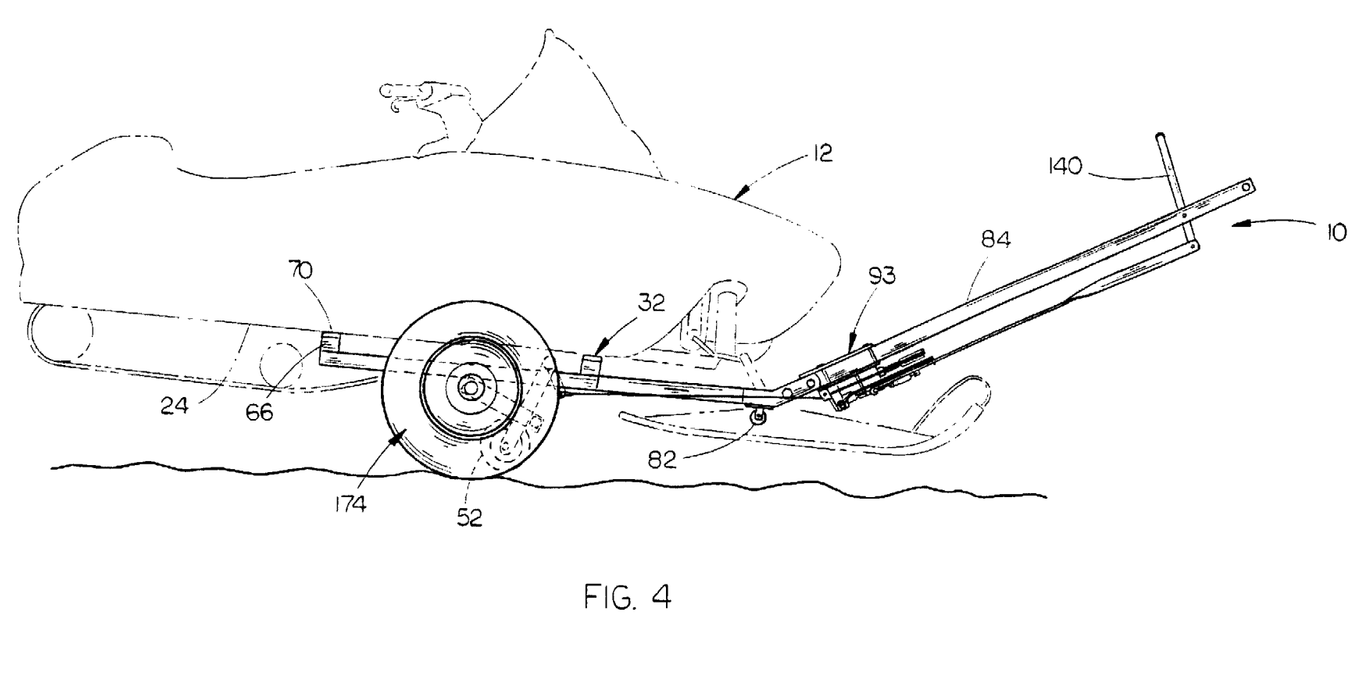
FIG. 4 is a view similar to FIG. 3 except that the large auxiliary wheels have been selectively mounted on the dolly.
Figure 5:
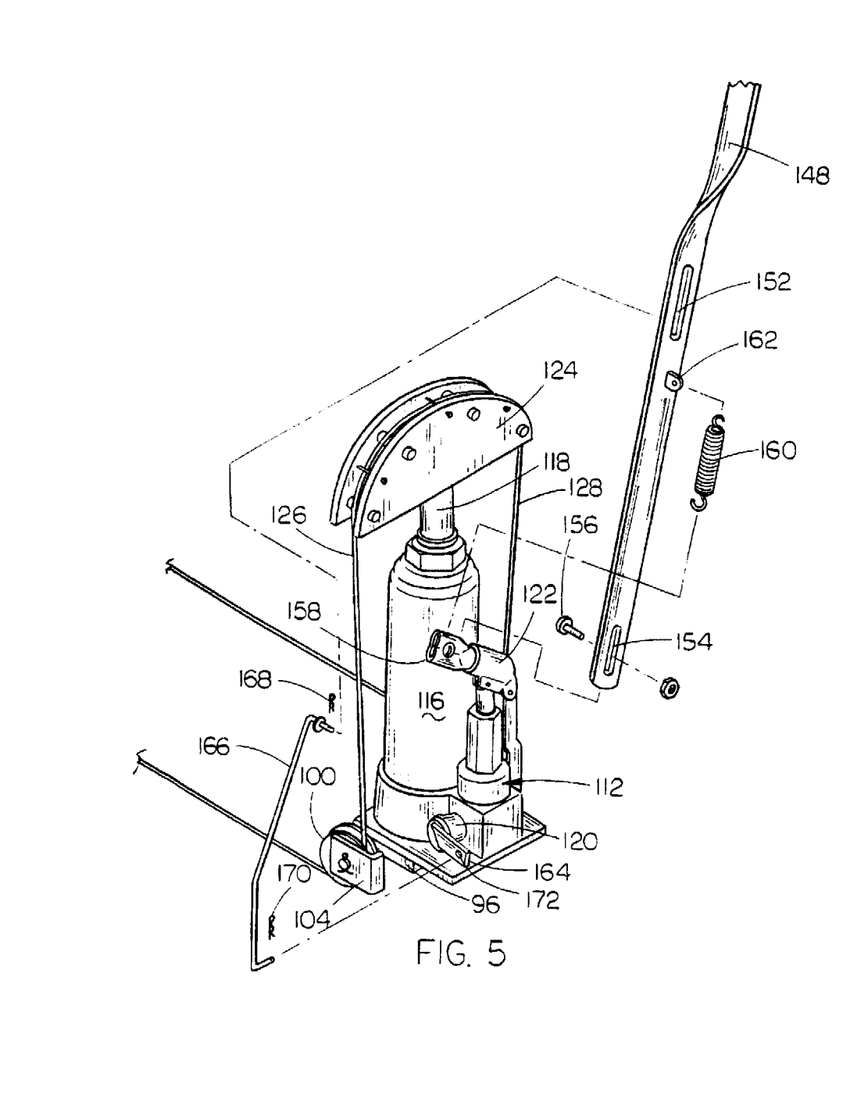
FIG. 5 is an exploded perspective view of the hydraulic jack of this invention and its relationship with certain of the components.
Figure 6:
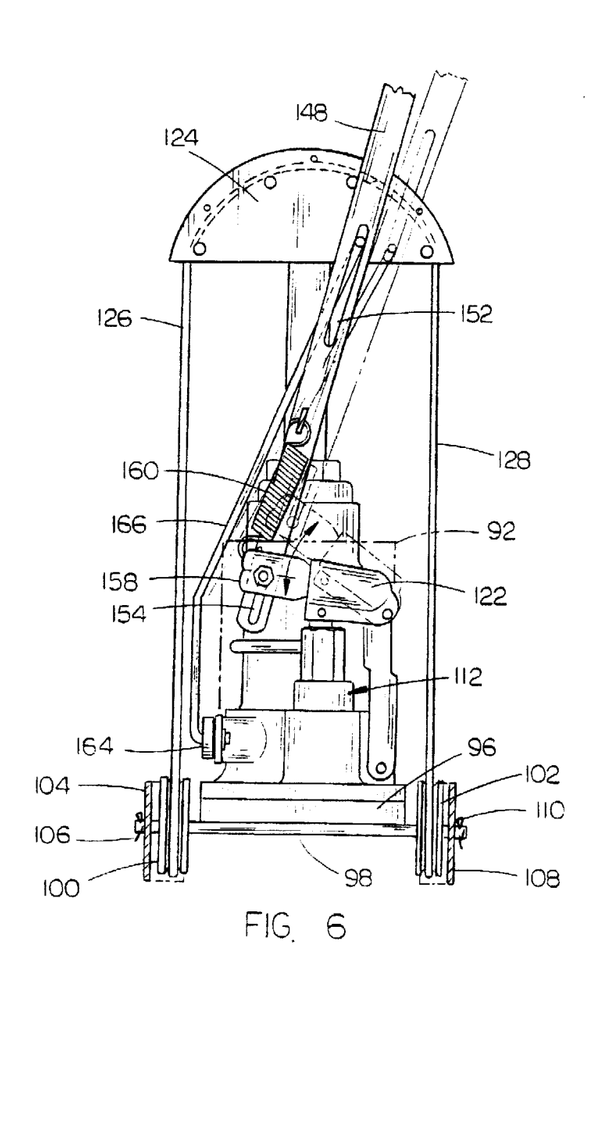
FIG. 6 is a view of the jack of FIG. 5 as seen from the right of FIG. 5.
Figure 7:
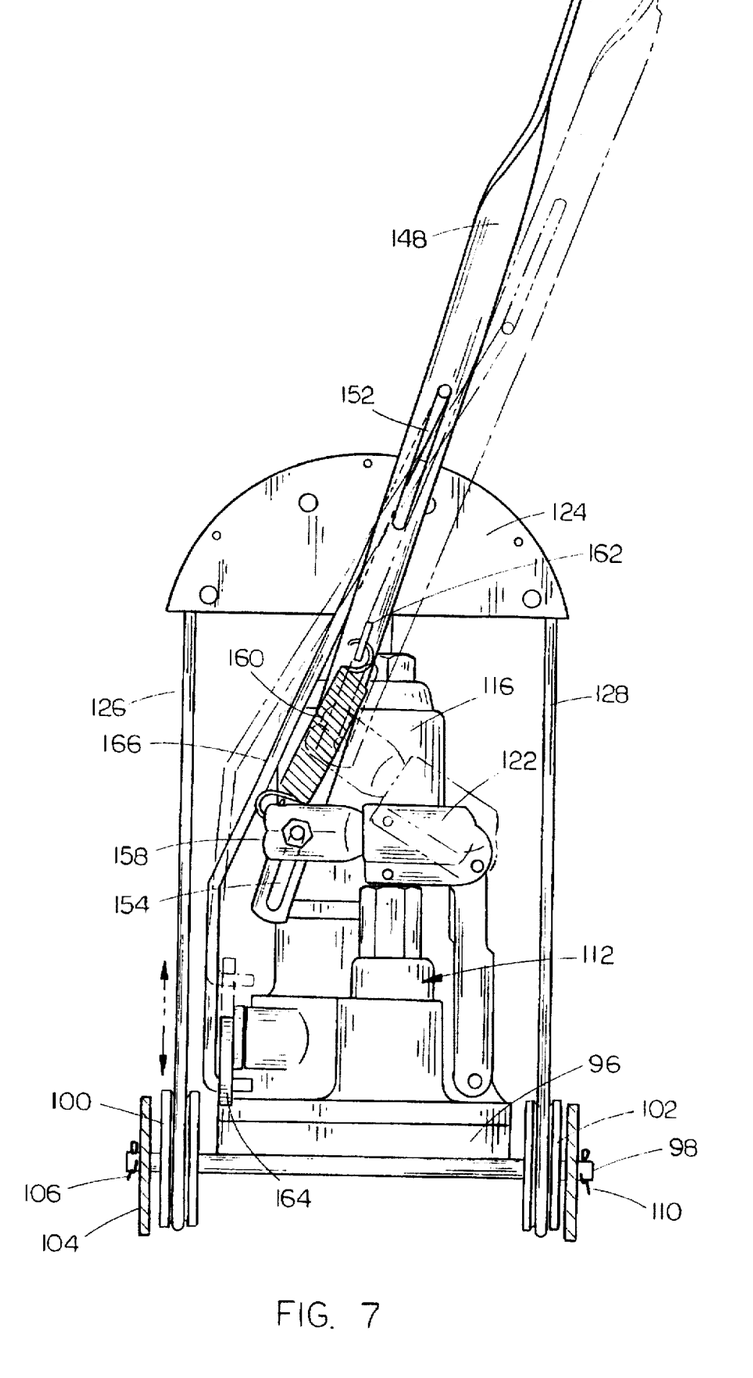
FIG. 7 is an enlarged view of FIG. 6.

Assuming that the support wheels 52 and 56 and the wheel 82 are in engagement with the ground or floor surface and further assuming that the side frame members 40 and 42 are in their lowermost positions, and further assuming that the valve actuator 120 of the hydraulic jack 112 is in its open position, the method of operation is as follows. The upper end of the crank member 140 is first pulled toward the operator who will be standing forwardly of the upper end of the handle portion 86 and will pull the upper end of the crank towards him or her. The movement of the crank member 140 towards the operator causes the bar 148 to move downwardly with respect to the upper end of the arm 166 until the upper end of arm 166 engages the upper end of the slot 152. Continued movement of the crank member 140 causes the upper end of arm 166 to engage the upper end of the slot 152 so that the arm 166 will be moved downwardly with the bar 148 to cause the valve actuator 120 to be pivotally or rotatably moved to its closed position. The operator then returns the crank member 148 to its neutral original position. The operator then moves the crank member 148, in a reciprocating fashion, from the original neutral position to its forwardmost position (towards the operator). Continued reciprocal movement of the crank member 140, in the manner just described, causes the lower end of the bar 148 to reciprocate the actuator 122, in a pumping fashion, inasmuch as the bolt 156 connecting the bar 148 and the pipe stub 158 is in engagement with the upper end of the slot 154. Extension of the ram 118, by the reciprocating movement of the crank member 140, causes the connector assembly 124 at the end of the ram 118 to move upwardly beneath the handle portion 86 which causes the cable portions 126 and 128 to pull forwardly on the arms 130 and 132 which causes the rotation of pivot shaft 44 with respect to the side frame members 40 and 42. Continued actuation of the hydraulic jack 112 by the crank member 140 causes the side frame members 40 and 42 to be raised upwardly into engagement with the underside of the snowmobile 12 and to raise the rearward end of the snowmobile 12 out of engagement with the ground or floor surface. Support member 62 limits the travel of arms 130 and 132 to prevent over-travel and hence over-centering of wheels 52 and 56 beneath pivot shaft 44. At this time, the skis 28 will still be in engagement with the supporting surface. The upper end of handle 171, formed of handle portions 76 and 84, is then moved upwardly which raises the skis 28 out of engagement with the supporting surface with the wheels 52 and 56 serving as the pivot point. When the dolly 10 has been moved to the position illustrated in FIG. 3, the snowmobile 12 may be easily moved and maneuvered.

In the event where the dolly is positioned on a ground surface wherein the wheels 52 and 54 would sink into the ground thereby making the moving of the dolly and snowmobile a difficult task, a pair of large auxiliary wheel assemblies 174 and 176 are utilized. Inasmuch as both of the assemblies 174 and 176 are identical, only assembly 176 will be described in detail. Wheel assembly 176 includes a rim or wheel 178 having a tire 180, preferably pneumatic, mounted thereon. An axle 182 is rotatably mounted in hub 184 of wheel 178 and has an arm 186 welded to the inner end thereof which extends transversely with respect to the rotational axis of axle 182. Square tube 188 is welded to the outer end of arm 186 and extends transversely therefrom. Tube 188 is adapted to be removably received within square tube 60. Similarly, the tube 188' on wheel assembly 174 is adapted to be removably received within square tube 58.

When the wheel assemblies 174 and 176 are mounted on the tubes 58 and 60, the tires thereof engage the ground surface, rather than the wheels 52 and 56, due to their larger diameters. The larger tires on wheel assemblies 174 and 176 make the dolly 10 and snowmobile 12 thereon easier to move on ground surfaces.

When it is desired to lower the snowmobile into engagement with the ground or support surface, the handle 171 is lowered so that the skis 28 are lowered into engagement with the supporting surface. The wheel 82 will also be in engagement with the supporting surface at that time. The upper end of the crank member 140 is then moved downwardly (towards the snowmobile) from its neutral position so that the upper end of arm 166 engages the lower end of the slot 152 which causes the arm 166 to be pulled upwardly so that the valve actuator 120 is pivotally moved from its closed position to its open position. The weight of the snowmobile 12 on the side frame members 40 and 42 will cause the side frame members 40 and 42 to move downwardly which causes the pivot shaft 54 to rotate with respect thereto. The rotation of the pivot shaft 54 as the snowmobile 12 is lowered into engagement with the supporting surface causes the forward or upper ends of the cables 126 and 128 to exert force on the connector assembly 124 thereby causing the power ram 118 to retract within the cylinder body 116. The dolly 10 may then be removed from beneath the snowmobile 12.

Figure 8:
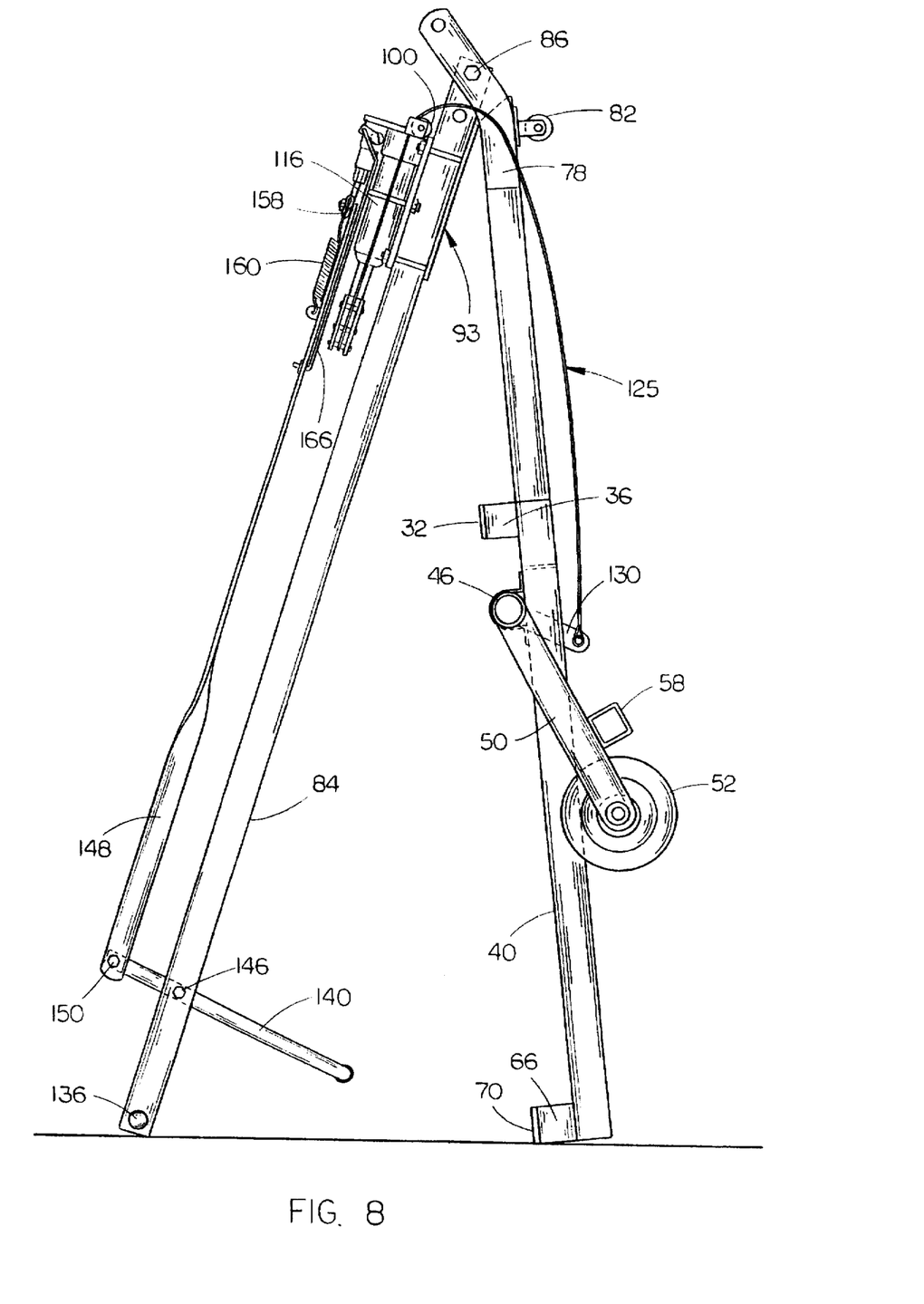
FIG. 8 is a side elevational view of the dolly in a folded storage position.

When it is desired to store the dolly 10, so that it occupies less space than in the position of FIG. 1, pin 88 is removed so that handle portion 84 may be pivotally moved with respect to handle portion 76 from the position of FIG. 1 to the position illustrated in FIG. 8 and stored upon the supporting surface, as illustrated in FIG. 8.

Thus it can be seen that a novel snowmobile dolly has been provided which accomplishes at least all of its stated objectives.

We claim:

1. A dolly for moving a snowmobile, said snowmobile including a body having a forward end, a rearward end, opposite sides, an underside, a movable endless track extending downwardly from said underside at the rearward end of said body which is positioned between said opposite sides and a pair of horizontally spaced-apart skis at the forward end of said body, comprising:

a substantially U-shaped frame including an elongated front frame member having opposite ends, an elongated first side frame member secured to said front frame member at one end thereof and extending rearwardly therefrom and an elongated second side frame member secured to said front frame member at the other end thereof and extending rearwardly therefrom;

the distance between said first and second side frame members being such that said U-shaped frame may be moved rearwardly underneath said body between said skis and being such that said first and second side frame members may be positioned on opposite sides of said track;

an elongated pivot shaft rotatably secured to said first and second side frames and extending therebetween;

said pivot shaft having first and second ends;

a first wheel support secured to said first end of said pivot shaft and extending transversely with respect to the longitudinal axis of said pivot shaft;

a second wheel support secured to said second end of said pivot shaft and extending transversely with respect to the longitudinal axis of said pivot shaft;

said first and second wheel supports each having a forward end secured to said pivot shaft and each having a rearward end positioned rearwardly of the forward end thereof;

a first wheel rotatably secured to the rearward end of said first wheel support;

a second wheel rotatably secured to the rearward end of said second wheel support;

an elongated handle having rearward and forward ends;

said rearward end of said handle being secured to said front frame member and extending forwardly therefrom;

a hydraulic jack operatively secured to said handle;

said jack including an elongated body having an elongated power ram selectively movably extending therefrom;

said jack also including a manually operable valve for controlling the operation of said ram and including a reciprocable actuator for extending said ram from said jack body;

said jack being disposed with respect to said handle so that the longitudinal axis of said jack body and said ram are parallel to the longitudinal axis of said handle;

a lever pivotally secured to said handle and operatively secured to said jack actuator linkage means operatively interconnecting said ram and said pivot shaft whereby extension of said ram from said jack body causes said pivot shaft to pivot with respect to said U-shaped frame for lowering said first and second wheels into engagement with a supporting surface, and for raising said first and second side frame members into engagement with the underside of said snowmobile body to at least lift the rearward end of said snowmobile from engagement with the supporting surface to enable the snowmobile to be supported on said first and second wheels so that the snowmobile may be moved thereon and maneuvered through the use of said handle.

2. The dolly of claim 1 wherein said handle includes first and second handle portions which are selectively pivotally secured together to enable said handle to be selectively folded to a storage position.

3. The dolly of claim 1 wherein said handle includes a supporting surface engagement portion which engages the supporting surface as said jack is raising the rearward end of the snowmobile out of engagement with the supporting surface.

4. The dolly of claim 3 wherein the forward end of said handle is positioned above the supporting surface when said engagement portion is in engagement with the supporting surface.

5. The dolly of claim 1 wherein an elongated valve control rod is secured to said jack valve and extends forwardly therefrom towards the forward end of said handle.

6. The dolly of claim 1 wherein said linkage means comprises a flexible cable means.

7. The dolly of claim 1 wherein said linkage means comprises a U-shaped cable means.

8. The dolly of claim 1 wherein first and second auxiliary wheel supports are selectively removably secured to said first and second wheel supports, respectively, for movement therewith and wherein first and second auxiliary wheels are rotatably mounted on said first and second auxiliary wheel supports, respectively, said first and second auxiliary wheels having a substantially larger diameter than said first and second wheels and having a substantially greater width than said first and second wheels.

9. The dolly of claim 1 further including means for preventing the over-centering of said first and second wheels.

* * * * *